Dec. 13, 1955     E. H. DODGE ET AL     2,726,799
APPARATUS FOR EXHAUSTING ELECTRIC DISCHARGE DEVICES
Filed March 23, 1953     8 Sheets-Sheet 1

INVENTORS
ERLE H. DODGE
LAWRENCE W. KIMBALL
BY Joseph C. Ryan
ATTORNEY

Dec. 13, 1955　　　　E. H. DODGE ET AL　　　　2,726,799
APPARATUS FOR EXHAUSTING ELECTRIC DISCHARGE DEVICES
Filed March 23, 1953　　　　　　　　　　　　　　8 Sheets-Sheet 2

INVENTORS
ERLE H. DODGE
LAWRENCE W. KIMBALL
BY
Joseph C. Ryan
ATTORNEY

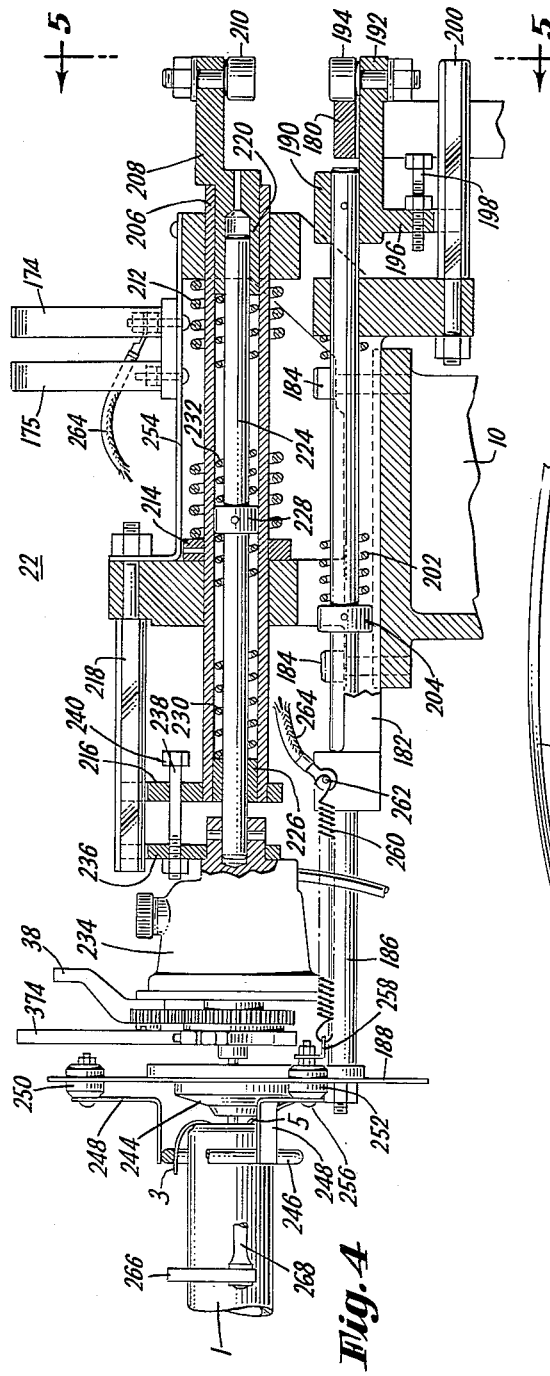

INVENTORS
ERLE H. DODGE
LAWRENCE W. KIMBALL
BY Joseph C. Ryan
ATTORNEY

INVENTORS
ERLE H. DODGE
LAWRENCE W. KIMBALL
BY
Joseph C. Ryan
ATTORNEY

INVENTORS
ERLE H. DODGE
LAWRENCE W. KIMBALL
BY
ATTORNEY

Dec. 13, 1955   E. H. DODGE ET AL   2,726,799
APPARATUS FOR EXHAUSTING ELECTRIC DISCHARGE DEVICES
Filed March 23, 1953   8 Sheets-Sheet 7

INVENTORS
ERLE H. DODGE
LAWRENCE W. KIMBALL
BY
Joseph C. Ryan
ATTORNEY

Dec. 13, 1955     E. H. DODGE ET AL     2,726,799
APPARATUS FOR EXHAUSTING ELECTRIC DISCHARGE DEVICES
Filed March 23, 1953           8 Sheets-Sheet 8
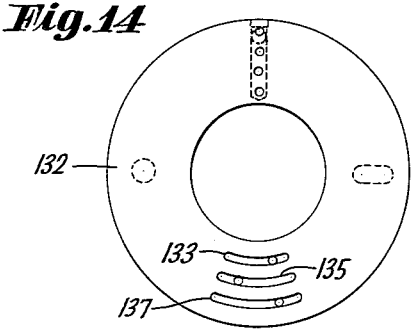
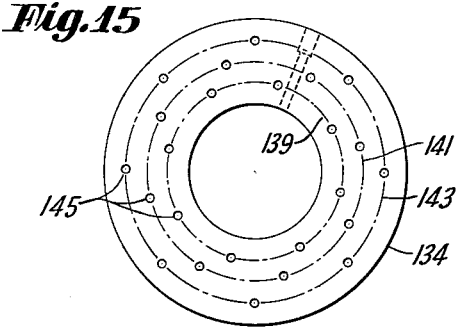
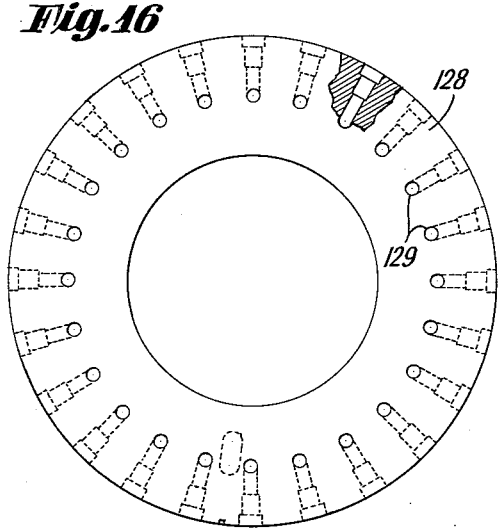
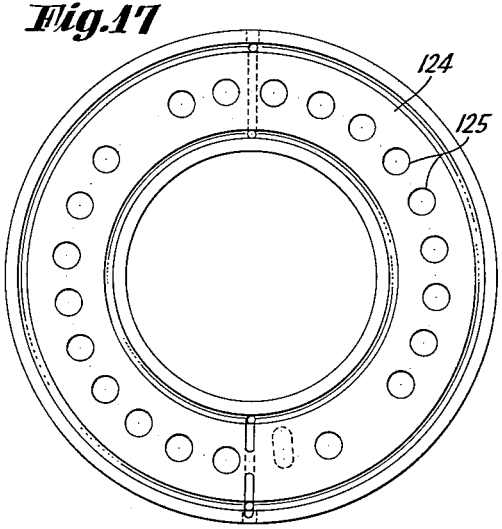
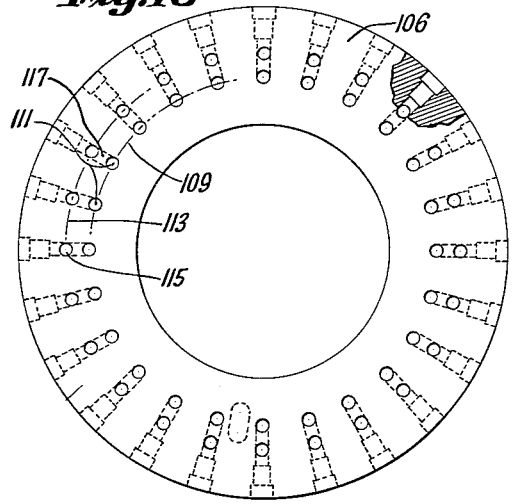
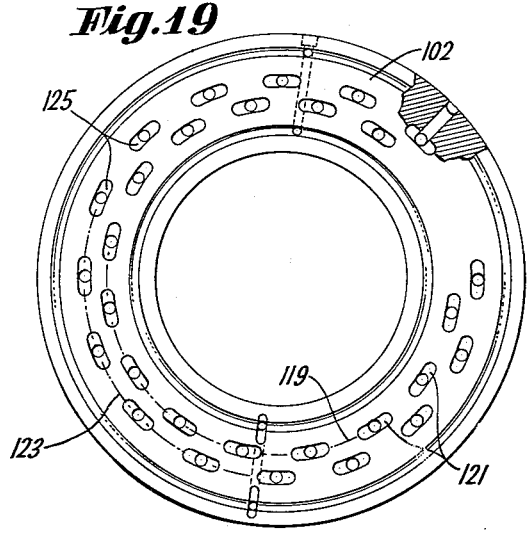

United States Patent Office 2,726,799
Patented Dec. 13, 1955

2,726,799

APPARATUS FOR EXHAUSTING ELECTRIC DISCHARGE DEVICES

Erle H. Dodge, Beverly, and Lawrence W. Kimball, Bedford, Mass., assignors to Sylvania Electric Products Inc., Salem, Mass., a corporation of Massachusetts Application March 23, 1953, Serial No. 343,842

24 Claims. (Cl. 226—19)

This invention relates to the manufacture of electric discharge devices and more particularly to the exhausting operation performed on these devices during their manufacture.

In the manufacture of electric gaseous discharge devices, such as fluorescent lamps for example, it has been the general practice heretofore to perform the exhausting and filling operations through a single slender tubulation, commonly called an exhaust tube, projecting from a lamp mount at one end of the lamp tube and in communication with the interior thereof. The addition of larger lamps to the fluorescent lamp line has served to accentuate the time factor involved in the performance of these operations. The larger the lamp, the more time-consuming the evacuation operation becomes.

An object of our invention is to effect a marked reduction in the amount of time required to perform the exhausting operation in the manufacture of electric discharge devices.

Another object is to provide an apparatus for evacuating electric discharge devices at a speed substantially greater than the speeds heretofore attainable.

A further object is to improve the quality of electric discharge devices.

A further object is to provide an apparatus for evacuating electric discharge devices quicker and more thoroughly than they have been heretofore.

A further object is to provide a continuous motion conveyor for electric discharge devices during evacuation thereof.

A further object is to provide an apparatus for exhausting and filling electric gaseous discharge devices, particularly fluorescent lamps, which will insure the improvement of the quality thereof.

These and other objects, advantages and features of our invention will be apparent to those skilled in the art from a study of a specific embodiment thereof shown in the accompanying drawings and described below.

In one embodiment of our invention, an electric gaseous discharge device, such as a fluorescent lamp for example, having a tubulation at each end thereof and in communication with the interior thereof, while disposed in a horizontal plane, is carried by a pair of heads through a predetermined path, along which the exhausting and filling operations are performed. The heads and their conveyor are designed so that the lamps may be advanced by a continuous motion rather than an intermittent motion as heretofore employed. Each head has its own tipping torch and one head of each pair of heads has its own mercury dispenser. The stationary plate of each valve, through which communication to the tubulation at each end of the lamp is established, is provided with a multiplicity of tubes for connecting the lamp to any desired number of operational devices, such as vacuum pumps, flushing and filling gas supplies, compressed air sources, etc. Thus, for example, a flushing gas may be introduced into the lamp at one end thereof and evacuated from the other end, or, the lamp may be flushed and evacuated alternately at both ends.

In the specific embodiment of our invention illustrated in the accompanying drawings:

Figure 4 is a longitudinal sectional view of the actuating portion of one of the heads.

Figure 5 is an end view of the head of Figure 4 looking in the direction of the line 5—5 of Fig. 4 and showing the contact fingers through which a source of electric energy is connected to the lead-wires of the lamp.

Figure 7a is a transverse sectional detail of the tipping torch burner taken along the line 7a—7a of Fig. 6.

Figure 14 is a detail of the stationary plate and Figure 15 is a detail of the movable plate of the tipping torch valve.

Figure 16 is a detail of the movable plate and Figure 17 is a detail of the stationary plate of the valve associated with the head of Figure 6.

Figure 18 is a detail of the movable plate and Figure 19 is a detail of the stationary plate of the valve associated with the head of Figure 9.

Figure 1:
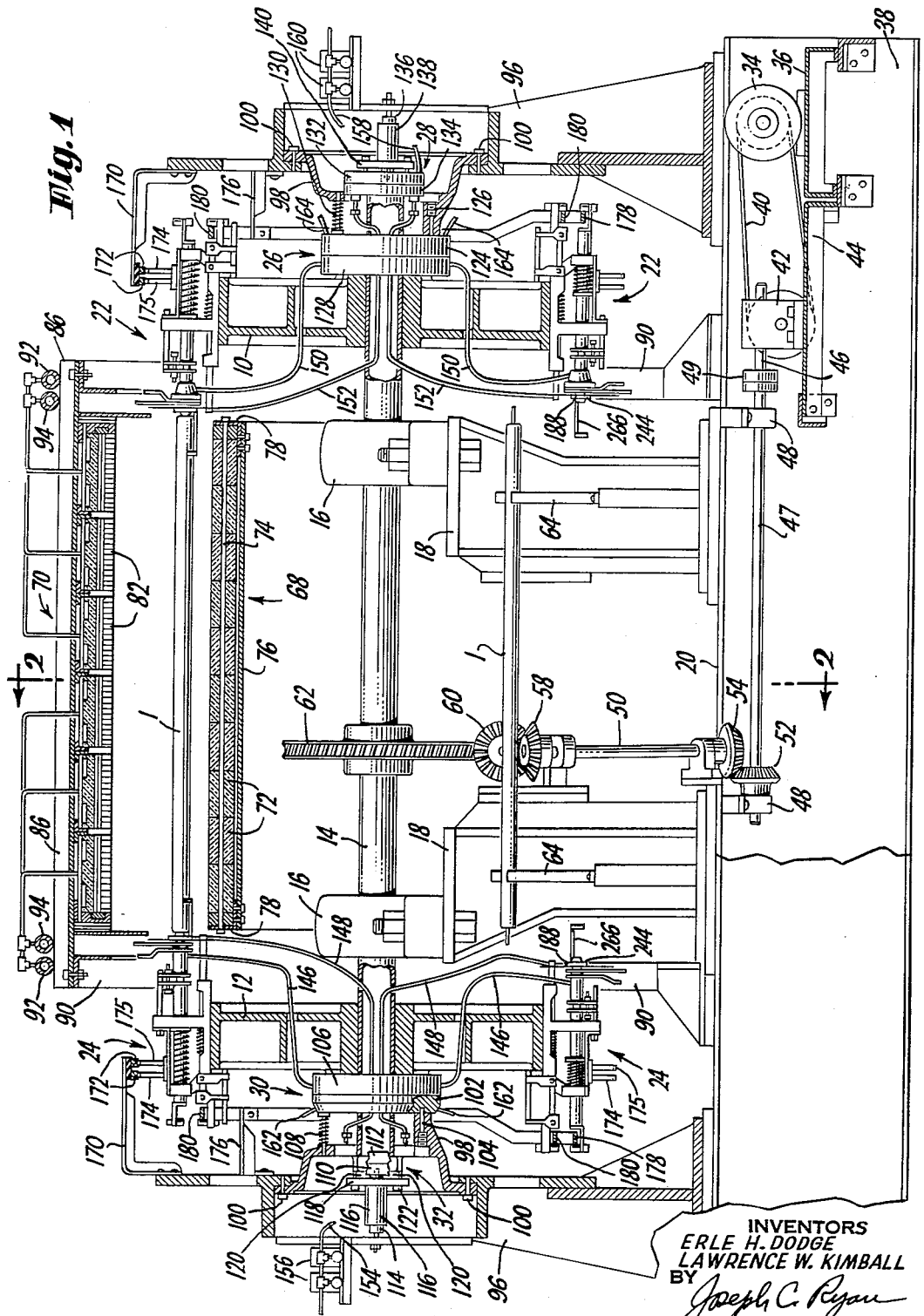
Figure 1 is a longitudinal sectional view of an exhaust machine embodying the principles of our invention, showing particularly the conveyor and its driving mechanism.
Figure 2:
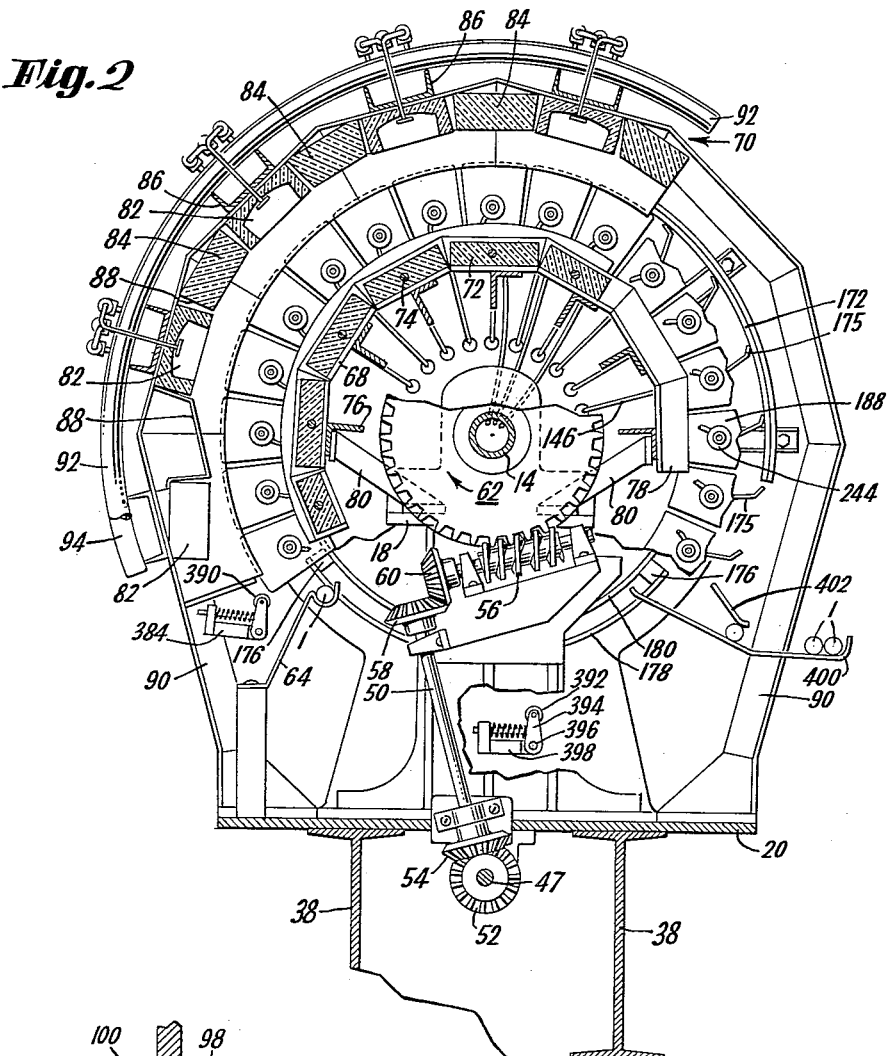
Figure 2 is a transverse sectional view of the exhaust machine of Figure 1, looking in the direction 2—2 of Fig. 1.

Referring now to the drawings, particularly Figures 1 and 2 thereof, the lamp exhaust machine comprises a pair of spiders 10 and 12 keyed to a shaft 14 supported in bearing brackets 16 mounted on tables 18 on a base 20. A plurality of heads, designated generally by reference numeral 22, are mounted about the periphery of spider 10; and a plurality of heads, designated generally by the reference number 24, are mounted about the periphery of spider 12. The shaft 14 is provided with a pair of valves 26 and 28 at the end thereof adjacent to spider 10, and a pair of valves 30 and 32 at the end thereof adjacent to spider 12. Valves 26 and 28 serve as the means through which communication may be established to the heads 22, and valves 30 and 32 serve as the means through which communication may be established to the heads 24, as will be described more fully below.

The shaft 14, on which the head-carrying spiders 10 and 12 are mounted, is driven by a motor 34 mounted on a table 36 which is mounted on and disposed between a pair of I beams 38 which support the machine base 20. The motor 34 is connected by a belt 40 to a gear reduction mechanism 42 mounted on table 44. Shaft 46 of the gear reduction mechanism 42, drives shaft 47, which is supported in bearing brackets 48 depending from the base 20, through an overload release coupling 49. Shaft 47 drives shaft 50 through miter gears 52 and 54. Worm 56 (Fig. 2) is driven by shaft 50 through miter gears 58 and 60. Gear 62, which is keyed to shaft 14, is driven by worm 56.

Lamps to be processed on the exhaust machine of this invention may be fed thereto automatically or manually. For purposes of illustration in this application, lamps are fed manually by an operator who places each lamp in a cradle defined by a pair of standards 64 mounted on the base 20, and locates it so that it assumes the position substantially the same as lamp 1 in Figure 2. When so disposed, the lamp 1 is in position to be removed from its cradle by a pair of cooperating heads 22 and 24. Each pair of cooperating heads 22, 24 carries a lamp from the loading end of the machine (left side of Fig. 2) to the unloading end thereof (right side of Fig. 2).

During the course of its travel from the loading to the unloading end of the exhaust machine, the lamps pass through an oven defined by an inner wall 68 and an outer wall 70. The inner wall 68 comprises a plurality of fire bricks 72 connected to one another by tie rods 74 and mounted on transverse angle iron members 76, and angle iron end members 78 to which the transverse angle iron members 76 are connected. The inner wall 68 of the oven is mounted on arms 80 mounted on tables 18. The outer wall 70 of the oven comprises alternate rows of burners 82 and insulating material 84. The burners 82 are mounted on channel iron members 86 and the rows of insulating material 84 are disposed in sheet metal pans 88. The channel iron members 86 and the pans 88 are mounted on horse-shoe shaped end frames 90 mounted on the base 20. Gas and air manifolds, 92 and 94 respectively, are supported from channel iron members 86 at each end of the oven. Each set of gas and air manifolds feeds a plurality of burners in each row.

Figure 3:
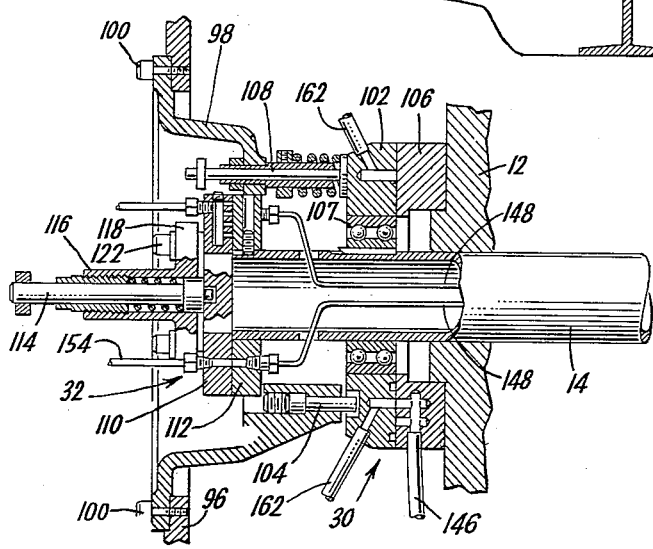
Figure 3 is an enlarged fragmentary detail in section of the valve assemblies associated with the spider and conveyor drive shaft at the left in Figure 1.

A frame 96 is mounted on the base 20 at each end of the machine (Fig. 1). A stationary valve plate support 98 is attached to each frame 96 by bolts 100. The plate 102 of valve 30 (left side of Fig. 1) is held stationary and prevented from rotating by means of pin 104 which extends through support 98 and into plate 102. A gas-tight seal is effected and maintained between stationary plate 102 and movable plate 106, which is fixedly mounted on the hub of spider 12, of valve 30 by means of a pair of spring-loaded pads 108 (one of which is shown), mounted in the support 98 (Fig. 3). The plate 102 of valve 30 is held concentric with plate 106 by a self-aligning bearing 107 which is mounted on shaft 14. The plate 110 of valve 32 is prevented from rotating, held in frictional engagement, and maintained concentric with movable plate 112, which is fixedly mounted on shaft 14, by means of a pair of spring-loaded shoulder pins 114 (one of which is shown) disposed within bosses 116 on support 118. The tips of the pins 114 extend into apertures therefor in the plate 110 to prevent rotation and to maintain concentricity; and the shoulders of the spring-loaded pins abut the outside face of the valve plate to effect and maintain frictional engagement of the plate 110 with the plate 112. Support 118 is mounted on pads 120 of support 98 by screws 122.

Referring now to the right hand side of Figure 1, plate 124 of valve 26 is held stationary and prevented from rotating by means of pin 126 which extends through support 98 and into plate 124. A gas-tight seal is effected and maintained between stationary plate 124 and movable plate 128, which is fixedly mounted on the hub of spider 10, by means of a pair of spring-loaded pads 130 (one of which is shown) mounted in the support 98. The plate 124 of valve 26 is held concentric with plate 128 by a self-aligning bearing 107 which is mounted on shaft 14. The plate 132 of valve 28 is prevented from rotating, held in frictional engagement, and maintained concentric with movable plate 134, which is fixedly mounted on shaft 14, by means of a pair of spring-loaded shoulder pins 136 (one of which is shown) disposed within bosses 138 on support 140. The tips of the pins 136 extend into apertures therefor in the plate 132 to prevent rotation and to maintain concentricity; and the shoulders of the spring-loaded pins abut the outside face of the valve plate to effect and maintain frictional engagement of the plate 132 with the plate 134.

Each of the heads 24 is connected to movable plate 106 of valve 30 by flexible tubing 146 and to movable plate 112 of valve 32 by flexible tubing 148. Each of the heads 22 is connected to movable plate 128 of valve 26 by flexible tubing 150 and to movable plate 134 of valve 28 by flexible tubing 152. Stationary plate 110 of valve 32 is connected by tubing 154 to gas and oxygen supply valves 156 mounted on the frame 96. Similarly, stationary plate 132 of valve 28 is connected by tubing 158 to gas and oxygen supply valves 160 mounted on the frame 96. A plurality of tubes 162 extending from stationary plate 102 of valve 30 and a plurality of tubes 164 extending from stationary plate 124 of valve 26 are connected to a multiplicity of feeding lines for effecting certain operations on the lamp at certain periods of time during the exhausting cycle, as will be described more fully below.

Although only two pairs of heads 22, 24 are shown in Figure 1, it is apparent from the construction of the machine shown therein that many more may be employed. The valves 26, 28, 30 and 32, the construction of which will now be described, have been designed to accommodate twenty-four pairs of heads 22, 24.

Since valves 28 and 32 are identical in construction only valve 28 will be described. Stationary plate 132 (Fig. 14) of valve 28 is provided with three concentric arcuate slots 133, 135 and 137. Movable plate 134 (Fig. 15) is provided with three concentric rings 139, 141 and 143 of ports 145, there being eight ports in each ring. The ports in each ring are located in staggered relationship with reference to the ports in the other rings so that they are all located on a different radial line from the center of the plate. The ports in each ring are spaced from one another a distance sufficient to make sure that only one port in that ring is in register with its corresponding arcuate slot in the stationary plate 132.

The movable plate 128 (Fig. 16) of valve 26 is provided with a plurality of ports 129 therein, each port being connected through tubing 150 (Fig. 1) to a head 22. The stationary plate 124 (Fig. 17) of valve 26 is provided with a plurality of ports 125 therein, each port defining a station on the plate. Communication to the ports 125 is established through tubes 164 (Fig. 1).

The movable plate 106 (Fig. 18) of valve 30 has a ring 109 of ports 111 and a ring 113 of ports 115 therein, each pair of ports 111 and 115 on a common radial line being connected to one another within the plate by manifold 117, to which tubing 146 (Fig. 1) extending to each head 24 is connected. Stationary plate 102 (Fig. 19) of valve 30 has a ring 119 of elongated slots 121 and a ring 123 of elongated slots 125 therein, the slots 121 in ring 119 being located in staggered relationship with reference to the slots 125 in ring 123. Each of the slots 121 and 125 defines a station on the plate. Communication to the slots 121 and 125 is established through tubes 162 (Fig. 1). The relative location of the slots 121 and 125 in the stationary plate 102 (Fig. 19) with respect to the ports 111 and 115 in the movable plate 106 (Fig. 18) is such that continuous communication may be established for each individual head 24 (Fig. 1) through its tubing 146 and manifold 117 in movable plate 106 to the tubes 162 extending from stationary plate 102, the path of this communication through the valve 30 being alternately through a port 111 in the movable plate 106 and a slot 121 in the stationary plate 102 on the one hand, and through a port 115 in the movable plate 106 and a slot 125 in the stationary plate 102 on the other hand. Thus, as a port 111 in the ring 109 of movable plate 106 starts to move out of communication with a slot 121 in the ring 119 of stationary plate 102, the port 115 in the ring 113, with which this particular port 111 is paired through the manifold 117, starts to move into communication with a slot 125 in ring 123 of stationary plate 102.

The relative location of the slots 121 in the inner ring 119 (Fig. 19) of the stationary plate 102 with respect to one another and with respect to the ports 111 in the inner ring 109 (Fig. 18) of the movable plate 106 on the one hand; and the relative location of the slots 125 in the outer ring 123 (Fig. 19) of the stationary plate 102 with respect to one another and with respect to the ports 115 in the outer ring 113 (Fig. 18) of the movable plate 106 on the other hand, is such that two heads 24 are never in communication with one another through this valve. Thus manifolding of two or more heads is prevented and contaminants which may be in one lamp connected to a head 24 are isolated and prevented from being carried to another lamp in another head through the valve.

Figure 21:
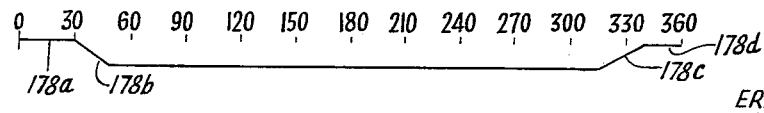
Figure 21 is a developed schematic diagram of a head housing cam.
Figure 20:
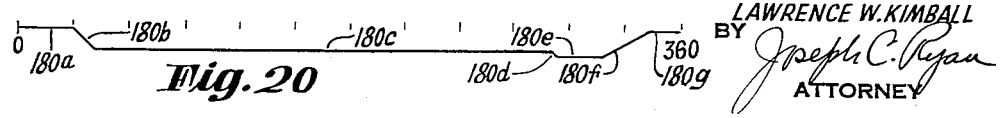
Figure 20 is a developed schematic diagram of a tipping torch cam.

Each of the two frames 96 at opposite ends of the machine (Fig. 1) has a plurality of inwardly extending arms 170 attached to the periphery thereof which support a pair of commutator tracks 172. The tracks 172 are engaged during a portion of the operating cycle of the machine by flexible metal fingers 174 and 175 which are a part of the heads 22 and 24. Each of the two frames 96 also has a plurality of inwardly extending arms 176 on which cam tracks 178 and 180, for actuating certain mechanisms of the heads 22 and 24, are mounted. A developed schematic diagram of cams 178 and 180 is shown in Figures 20 and 21. In these diagrams, 0°, which is taken as a reference point, is located directly beneath the shaft 14 (Fig. 2) and an imaginary circle is described about the shaft 14 as a center, moving in a clockwise direction. Referring first to Figure 20, cam 180 is characterized by a dwell 180a, a fall 180b, a dwell 180c, a fall 180d, a dwell 180e, a rise 180f and a dwell 180g. Referring now to Figure 21, cam 178 is characterized by a dwell 178a followed by a fall 178b to one end of the cam, the other end of the cam being characterized by a rise 178c followed by a dwell 178d.

As was mentioned above in connection with the description of Figure 1, a plurality of heads, designated generally by reference numeral 22, are mounted about the periphery of spider 10; and a plurality of heads, designated generally by the reference numeral 24, are mounted about the periphery of spider 12. Since the mechanisms for actuating the heads 22 are the same as the mechanisms for actuating the heads 24, only the mechanisms associated with a head 22 will be described.

Referring now to Figure 4, the head 22 comprises a base 182 which is attached to the spider 10 by bolts 184 and which serves as a support for the several components of the head. A rod 186, supported in bearings in the base 182, has a burner plate 188 mounted on one end thereof and a block 190 mounted on the other end thereof. The block 190 has a laterally extending arm 192 in which cam follower 194 is supported and a bifurcated arm 196 depending therefrom. The arm 196 has a screw stop 198 extending therethrough and engageable with the base 182. The bifurcated portion of the arm 196 rides on a rod 200 mounted on the base 182. The rod 186 is loaded by spring 202 disposed thereon between a face of the base 182 and collar 204 mounted on the rod.

A sleeve 206, supported in bearings in the base 182, has an arm 208 mounted on one end thereof, and a cam follower 210 depending from and supported by the arm. The sleeve 206 is loaded by spring 212 disposed thereon between a face of the base 182 and collar 214 mounted on the sleeve. The other end of sleeve 206 has a bifurcated arm 216 mounted thereon, the bifurcated portion thereof riding on a rod 218 mounted on the base 182. The arm 208, which is mounted on one end of the sleeve 206, has a sleeve portion 220 disposed within the sleeve 206. The sleeve portion 220 of arm 208 serves as a bearing for one end of rod 224. The rod 224 is supported near the other end thereof by bearing 226 in sleeve 206. A collar 228, mounted on rod 224 substantially midway between the ends thereof, in conjunction with springs 230 and 232 disposed on rod 224, load the rod 224 in both its advanced and retracted positions, as will be described more fully below. A mercury reservoir 234 is mounted on rod 224 of head 22. The reservoir 234 has a bifurcated arm 236 mounted thereon, the bifurcated portion thereof riding on rod 218. A bolt 238, mounted on arm 236, extends freely through arm 216, the head 240 thereof serving as a stop against arm 216.

The burner plate 188, which is mounted on rod 186, has a burner 244 mounted thereon. An electrical contact ring 246, concentric with the burner 244, is supported on metal legs 248 mounted on insulating buttons 250 and 252 on plate 188. Lead-wire 3 of lamp 1 is electrically connected to the flexible metal finger 174, mounted on bracket 254 on the base 182, through ring 246, one of the legs 248, screw 256 which extends through insulating button 252, bracket 258 which is mounted on the screw 256, spring 260 which connects the bracket 258 to terminal post 262 mounted on base 182, and wire 264 which connects the terminal post 262 to the finger 174. Lead-wire 5 of lamp 1 extends across the face of burner 244 and is grounded, through the several components of head 22, to finger 175. A cradle 266, for picking a lamp up from the lamp feeding mechanism at the loading end of the lamp exhaust machine, is attached to the free end of an arm 268 (Figs. 4, 6 and 7) mounted on the burner plate 188.

Figure 9:
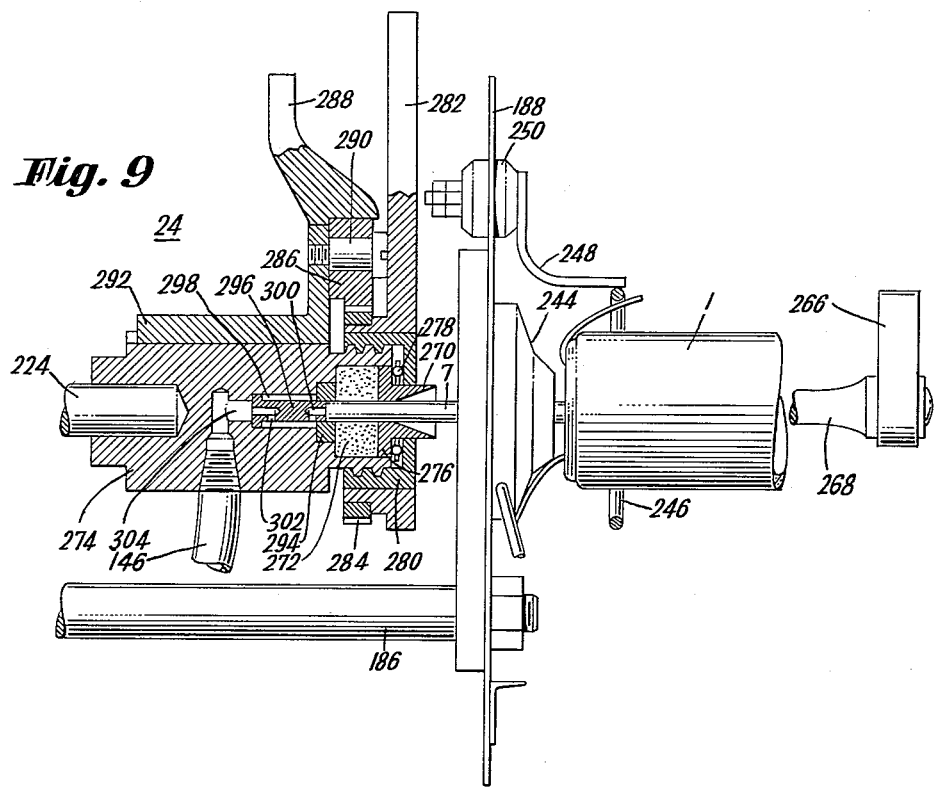
Figure 9 is a longitudinal sectional view of the other head of the pair of heads to which a lamp is connected.

Each lamp 1 has a tubulation 7 projecting from each end thereof. The lamp is held during the exhaust cycle by these tubulations. Referring now to Figure 9, the tubulation 7, projecting from the end of the lamp shown in this figure, extends through the burner 244 on the burner plate 188, and a funnel guide 270 and resilient collar 272 seated in block 274 mounted on rod 224. The funnel guide 270 has a flange 276 which abuts a face of the resilient collar 272. A ball-bearing race 278, concentric with the funnel guide 270, is disposed between the flange 276 of the funnel guide and a cap 280 which is threaded on the block 274. A lever 282, clamped to the cap 280, has a gear 284 mounted thereon. The gear 284 meshes with gear 286 of lever 288 which is pivotally mounted at 290 in bracket 292 mounted on block 274.

As was mentioned above, the tubulation 7 projects through resilient collar 272 in block 274. The free end of the tubulation 7 lies within a collar 294 seated in block 274 and abuts the shank end of ejector pin 296 which is slidably disposed in chamber 298 in block 274. The ejector pin 296 is provided with a port 300 at one end thereof and a port 302 at the other end thereof, each port being defined by a pair of connecting holes drilled in the pin at right angles to one another. Port 300 establishes communication between the lamp tubulation 7 and the chamber 298 in the block. Port 302 establishes communication between chamber 298 and bore 304, the bore 304 being in communication with tubing 146.

Figures 6, 7:
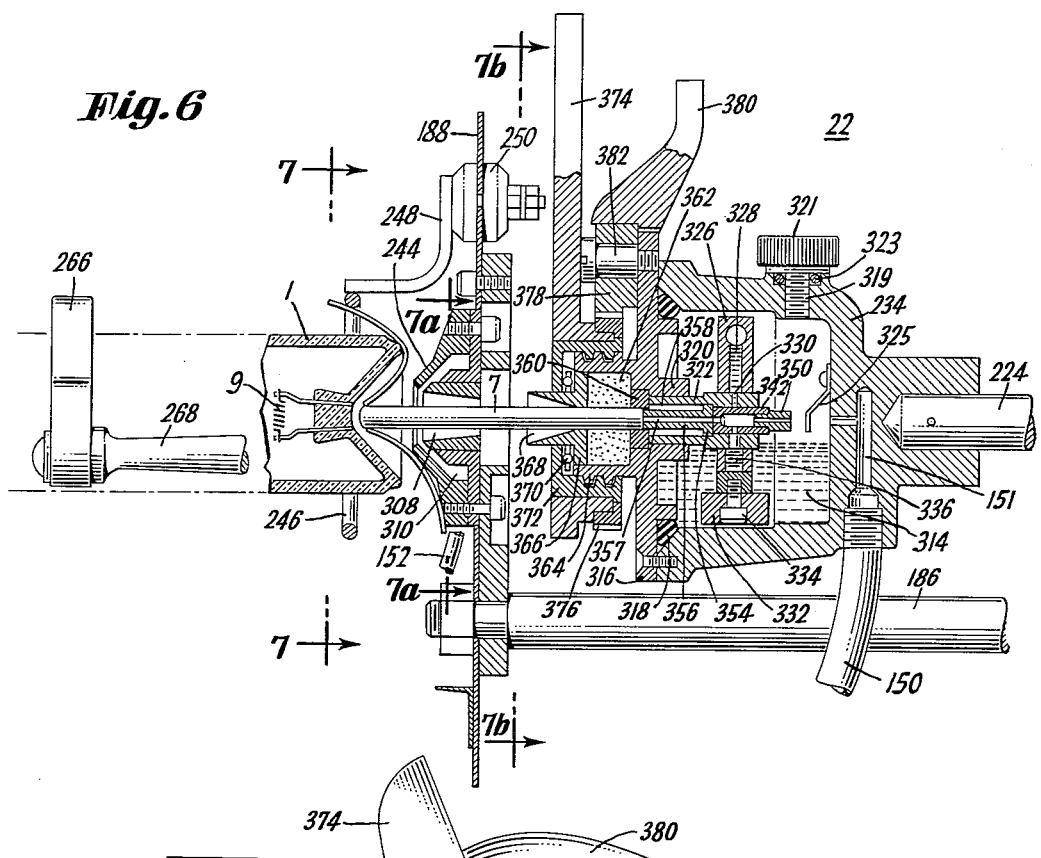
Figure 6 is a longitudinal sectional view of one head of the pair of heads to which a lamp is connected.
Figure 7 is a front elevational view of the head of Fig. 6 looking in the direction of the line 7—7 thereof.

Referring now to Figure 6, the burner 244, which is mounted on the burner plate 188, is provided with a centrally located aperture 308 through which tubulation 7 extends, and a gas chamber 310 to which gas is supplied through tubing 152.

Reservoir 234, within which a supply of mercury 314 is disposed, is provided with a cover plate 316, and an air-tight seal therebetween is effected by O-ring 318.

Mercury is introduced into the reservoir through port 319 which is capped by filler plug 321 and sealed by O-ring 323. A baffle plate 325 is centrally mounted on the inner face of the end wall of the reservoir 234. Cover plate 316 is provided with a boss 320 within which a sleeve 322 is mounted. A mercury bucket, designated generally by reference numeral 324 (Fig. 8), is rotatably disposed on sleeve 322.

The mercury bucket 324 has a scoop 326 at one end thereof, the scoop having a chamber 328 therein in register, when the bucket is in the rest position, with a port 330 in sleeve 322. A screw 334, extending through a float 332 such as an aluminum block for example, is threaded into the head of a shoulder screw 336 which is, in turn, threaded into the mercury bucket 324 at the end thereof opposite the scoop 326 and in register with chamber 328. Shoulder 338 (Fig. 8) of screw 336 lies within slot 340 in sleeve 322 and permits rotation of the mercury bucket 324 on the sleeve 322 within the limits defined by this slot. Sleeve valve 342 is retained in position within sleeve 322 and is actuated by shoulder 344 of screw 336. Thus when the mercury bucket 324 rotates from the position shown in solid to the position shown in phantom in Figure 8, the shoulder 344 of screw 336 effects a similar rotation of sleeve valve 342, thereby bringing the port 346 in valve 342 into register with port 330 in sleeve 322. The mercury bucket 324 is provided with a port 348 in alignment with port 346 in sleeve valve 342. Thus, when the mercury bucket assumes the position shown in phantom in Figure 8, port 348 in the mercury bucket, port 330 in sleeve 322 and port 346 in the sleeve valve 342 are all in register with one another.

The sleeve valve 342 (Fig. 6) has a restriction sleeve 350 disposed in one end thereof. The other end of the sleeve valve 342 is abutted by the head 354 of ejector pin 356 which is slidably disposed in chamber 358 in sleeve 322. The tip of ejector pin 356 lies within collar 360 where it engages the end of tubulation 7 of lamp 1. Resilient collar 362, through which the tubulation 7 extends, and collar 360 are seated in block 364 which is integral with cover plate 316 of mercury reservoir 234. Flange 366 of funnel guide 368 abuts the resilient collar 362. Ball-bearing race 370, concentric with funnel guide 368 is retained in position abutting flange 366 of the funnel guide by a cap 372 which is threaded on block 364. A lever 374, clamped to the cap 372, has a gear 376 mounted thereon. The gear 376 meshes with gear 378 of lever 380 which is pivotally mounted at 382 on the cover plate 316 of the mercury reservoir 234.

Figure 10:
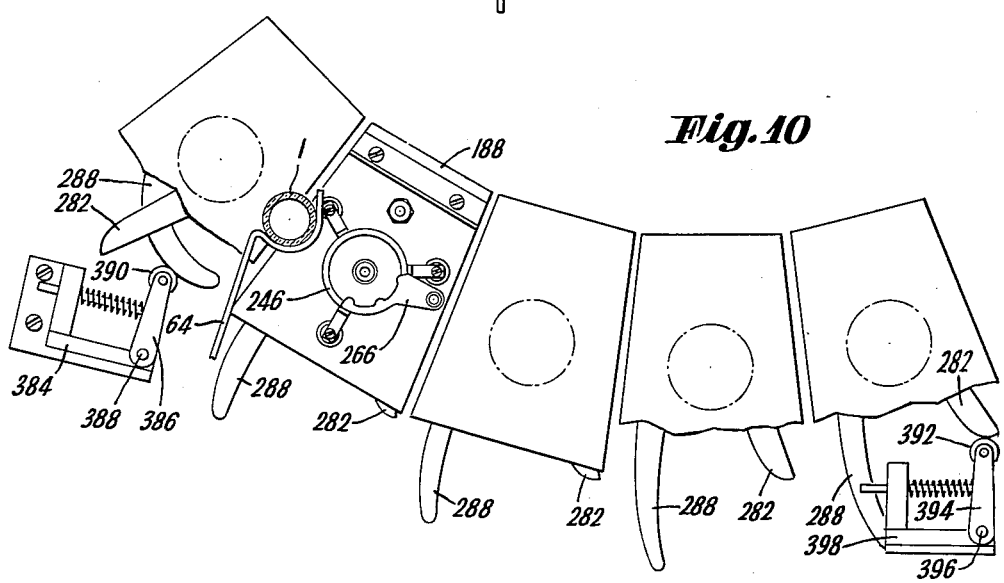
Figure 10 is an enlarged fragmentary detail view of that portion of the apparatus which is cut away in the lower portion of Figure 2, showing the devices for actuating the levers which open and close the ports in the heads within which the lamp tubulations are received.

The means for actuating levers 282 and 288 of head 24 (Fig. 9) will now be described, reference being had particularly to Figures 2 and 10. Bracket 384, mounted on angle iron end member 90, supports a spring loaded lever 386 pivotally mounted thereon at 388. A cam follower 390 is supported on the free end of lever 386 and lies in the path traversed by lever 288 of head 24, engagement of lever 288 with cam follower 390 taking place shortly after lamp 1 has been withdrawn by cradle 266 of the head from the lamp loading cradle 64. Actuation of the lever 288 by the cam follower 390 effects a compression of the resilient collar 272 (Fig. 9) about the tubulation 7 to effect a gripping of the tubulation to support the lamp and to provide an airtight seal within the head 24 to permit evacuation of the lamp. Rotation of lever 288 effects rotation of gear 286 which is a part thereof and gear 284 which meshes with gear 286 and which is a part of lever 282. Since lever 282 is clamped to threaded cap 280, the rotation of lever 282 retightens the cap 280 on the block 274, thereby exerting a compressing force on the resilient collar 272 through ball-bearing race 278 and flange 276 of funnel guide 270.

Figure 13:
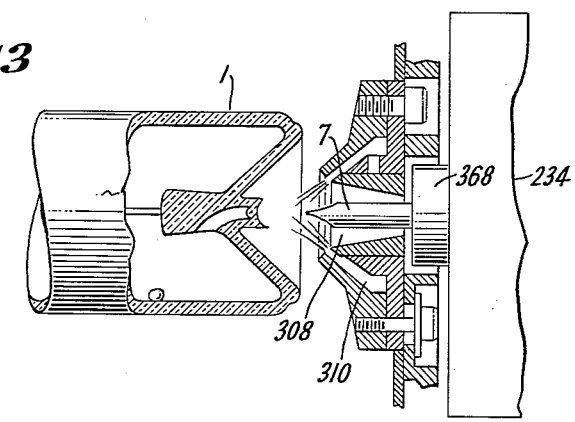

One of the last operations performed on a lamp on this machine is tipping the tubulation 7 from the lamp. When this has been done, only the tubulation 7 remains held in position by the compressed resilient collar 272 (Fig. 13). The tubulation 7 is released from the grip which the collar 272 exerts thereon when the lever 282 (Fig. 10) moves into engagement with and past cam follower 392 supported on spring-loaded lever 394 pivotally mounted at 396 on bracket 398 mounted on the machine frame (Figs. 2 and 10). Actuation of lever 282 by cam follower 392 rotates the lever 282 (Fig. 10) and the lever 288 through gears 284 and 286. This rotation of lever 282 loosens the threaded cap 280 on the block 274, thereby releasing the compressing force which had been exerted on the resilient collar 272 through the ball-bearing race 278 and the flange 276 of the funnel guide 270.

Figure 7B:
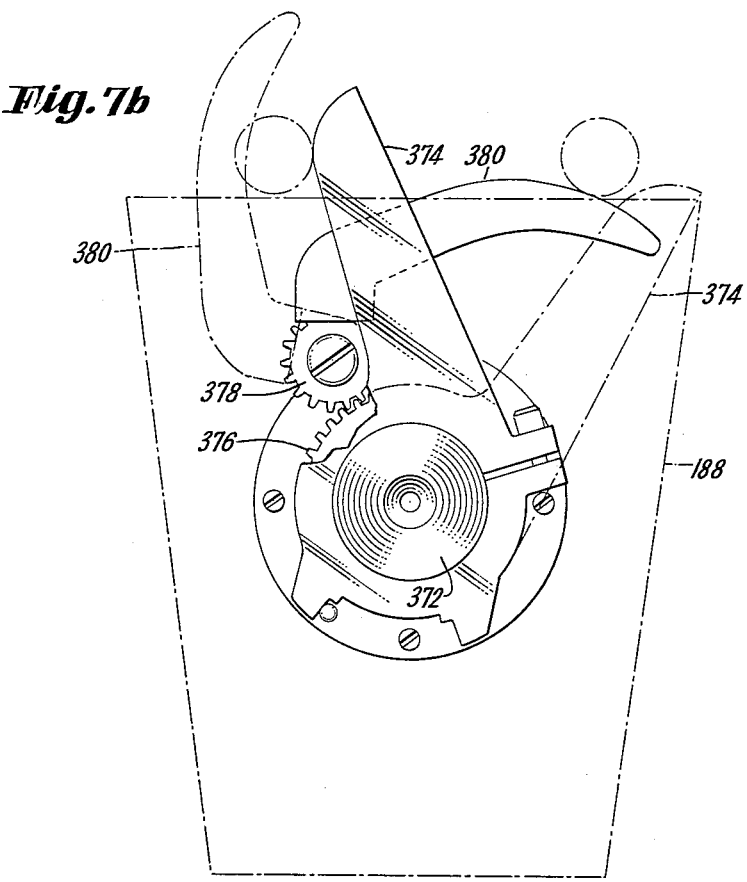
Figure 7b is a front elevational view of the head of Fig. 6 looking in the direction of the line 7b—7b of Figure 6, showing the mechanism for opening and closing the head port.

Mechanisms similar to those just described are disposed at the other end of the exhaust machine to actuate levers 374 and 380 of head 22 (Figs. 6 and 7b) for the same purposes as those just described in connection with levers 282 and 288 of head 24.

The sequence of operations of the apparatus of our invention will now be described, reference being made initially to Figures 1 and 2. Lamp 1 in the lamp loading cradle 64 is removed therefrom by the cradles 266 mounted on the arms 268, (Figs. 6 and 9) which are in turn mounted on the burner plates 188. The heads 22 and 24 then move in towards the ends of the lamp to encompass the tubulations 7 projecting from the ends thereof. Each of the burner plates 188 of heads 22, 24 is moved inwardly to encompass a tubulation 7 by the fall 180b of cam 180 (Fig. 20). As the cam follower 194 (Fig. 4) rides along the fall 180b, of cam 180, the spring 202, which loads rod 186 on which burner plate 188 is mounted, drives the burner plate inwardly. Block 364 of head 22 (Fig. 6) and block 274 of head 24 (Fig. 9) are each moved inwardly to encompass a tubulation 7 by the fall 178b (Fig. 21) of their respective cams 178. As the cam follower 210 (Fig. 4) rides along the fall 178b of cam 178, the spring 212 which loads sleeve 206 drives sleeve 206 inwardly. As the sleeve 206 moves inwardly, the rod 224 which is disposed therein, is driven inwardly by its spring 232. The inward movement of rod 224 (Fig. 6), on which the mercury dispenser 234 is mounted, moves the block 364, which is integral with the mercury dispenser cover plate 316, into encompassing relationship with respect to tubulation 7 at this end of the lamp; and the inward movement of rod 224 (Fig. 9) on which block 274 is mounted, moves the block 274 into encompassing relationship with respect to tubulation 7 at this end of the lamp. The tubulations 7 of the lamp now extends through resilient collar 272 in block 274 and resilient collar 362 in block 364.

With the lamp now supported by its tubulations 7 within the resilient collars 272 and 362 (the lamp having been lifted from the cradles 266 by the inward movement of the heads 22, 24 into encompassing relationship with respect to the tubulations 7), the collars 272 and 362 are now clamped tightly to the tubulations 7 by actuation of lever 288 (Fig. 9) and lever 380 (Fig. 6) respectively. Since the means employed to effect this clamping operation is substantially the same, only one will be described, reference being had particularly to Figures 9 and 10. As the lever 288 moved into engagement with and rides past spring-loaded cam follower 390 it is displaced thereby. The rotational movement of lever 288 is translated through gear 286 of lever 288, gear 284 of lever 282, and lever 282 which is clamped to cap 280, into a tightening of cap 280 on block 274. Tightening of the cap 280 effects a clamping of the resilient collar 272 tightly about the tubulation 7 through ball-bearing race 278 and flange 276 of funnel guide 270. The lamp is now supported by the heads 22, 24 and an air-tight seal about the tubulations 7 has been effected.

As will be apparent from Figure 2, shortly after the lamp has been gripped by a pair of heads 22 and 24, it enters the oven 68, 70 (Fig. 1). While in the oven, the lamp is flushed with an inert gas, such as argon for example, evacuated, and the cathodes thereof are heated to break down the electron-emissive material with which they are provided.

One of the tubes 164 (right side of Fig. 1) extending from stationary plate 124 of valve 26 is connected to a source (not shown) of inert gas, such as argon for example. The inert gas is fed intermittently to the tubing 150, extending out of the movable plate 128 of valve 26 through ports 125 (Fig. 17) in the stationary plate and ports 129 (Fig. 16) in the movable plate, as the ports in the latter plate move into and out of register with the ports in the former plate. The inert gas is fed from the tubing 150 to the lamp 1 (Fig. 6) through bore 151 in the mercury dispenser 234, restriction sleeve 350, sleeve valve 342, the bore 357 of ejector pin 356 and tubulation 7.

One of the tubes 162 (left side of Fig. 1) extending from stationary plate 102 of valve 30 is connected to a vacuum pump (not shown). Communication from tubing 146, extending from movable plate 106 of valve 30, to the lamp 1 is established (Fig. 9) through tubing 146, bore 304, port 302 in ejector pin 296, chamber 298, port 300 in ejector pin 296 and tubulation 7. As was mentioned above in connection with the description of the structural details of plates 102 and 106 of valve 30 (Figs. 18 and 19), pumping through this valve is continuous because of the relative location of the rings of elongated slots in the stationary plate 102 and the rings of ports in the movable plate 106.

The cathodes 9 of the lamp 1 (Fig. 6) are heated to break down the electron-emissive material with which they are provided by the passage of a current therethrough. The commutator tracks 172 at opposite ends of the machine (Fig. 1) are connected to a source of electrical energy (not shown). The tracks 172 are engaged by flexible metal fingers 174 and 175 mounted on the heads 22, 24. Each of the fingers 174 is electrically connected to lead-wire 3 at each end of lamp 1 (Fig. 4) through wire 264, terminal post 262, spring 260, bracket 258, screw 256, leg 248 of ring 246 and ring 246. As was mentioned above, lead-wire 5 at each end of lamp 1 extends across the face of burner 244 and is grounded, through the several components of its head, to finger 175.

Figure 8:
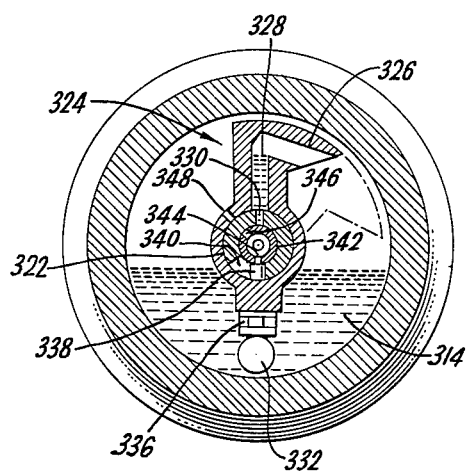
Figure 8 is a transverse sectional view of the mercury dispenser of Fig. 6.

After the lamp has been evacuated sufficiently, a measured quantity of mercury is introduced therein through the head 22. Referring now to Figures 6 and 8, the mercury bucket 324, as was described above, is rotatably disposed on sleeve 322 which is fixedly mounted in boss 320 of mercury dispenser cover plate 316. The limits of rotation of the bucket 324 are defined by the end walls of the slot 340 in sleeve 322, since shoulder 338 of screw 336, which is threaded into the bucket 324 opposite the scoop 326, lies within this slot. When the center of gravity of the scoop 326 of the mercury bucket 324 shifts to the right of a vertical line through the center of the mercury reservoir 234 (Fig. 8), the scoop 326 moves from the position shown in solid to the position shown in phantom, and the shoulder 338 of screw 336 traverses the slot 340 in fixed sleeve 322. Added impetus is given to this rotational movement of the bucket 324 by the float 332 which, because of its buoyancy, tends to rise towards the surface of the mercury in the reservoir. When the scoop 326 moves from the position shown in solid to the position shown in phantom in Figure 8, it shears the body of mercury in the chamber 328 from the mercury in port 330 in sleeve 322, the mercury filling port 330 being the quantity thereof which is to be introduced into the lamp. Since sleeve valve 342 is connected to mercury bucket 324 through shoulder 344 of screw 336, sleeve valve 342 rotates with the bucket, and the port 346 in sleeve valve 342 moves into register with port 330 in sleeve 322. With ports 330 and 346 in register, the mercury in port 330 may pass into sleeve valve 342. The mercury in sleeve valve 342 is swept into the lamp by the next flush, the path of the flushing gas being through port 348 (Fig. 8) in mercury bucket 324 (this port having been displaced from the position shown in solid to a position in register with ports 330 and 346 when the mercury bucket rotated to the position shown in phantom) and ports 330 and 346 into sleeve valve 342 as well as through restriction sleeve 350 (Fig. 6), sleeve valve 342, bore 357 of ejector pin 356, and tubulation 7. After a drop of mercury has been dispensed by the mercury dispenser, the travel of the head 22 displaces the bucket 324 and carries it into the body of mercury in the reservoir, thereby filling the chamber 328 for the next mercury dispensing operation.

After the mercury has been swept into the lamp, the inert gas which is to be sealed in the lamp is introduced through the same valve as the one through which the flushing gas was introduced, i. e., valve 26. Communication to the lamp through heads 22 and 24 is then terminated. Communication to the lamp through head 22 is terminated when the ports 129 in movable plate 128 (Fig. 16) of valve 26 move past a plurality of plugged ports 125 in stationary plate 124 (Fig. 17) of valve 26; and communication to the lamp through head 24 is terminated when the ports 111 and 115 in movable plate 106 (Fig. 18) of valve 30 move past a solid surface and a plurality of plugged slots 121 and 125 in stationary plate 102 (Fig. 19) of valve 30. The stationary plate 124 of valve 26 and the stationary plate 102 of valve 30 are provided with more ports and slots respectively than are necessary in this specific embodiment of the invention in order to facilitate adjustments in the flushing and exhausting schedules. It is because of this, therefore, that certain ports and slots are plugged as just described.

Each of the burners 244, hereinafter referred to as the tipping torches, is now lit by a pilot (not shown) fixedly mounted on end frame 90 adjacent to the path traversed by the heads 22, 24, a gas and oxygen mixture having been fed thereto through valves 28 and 32 (Figs. 1, 14 and 15). Since the action to effect tipping of the tubulations 7 from the ends of the lamp is the same at each end, the action at only one end will be described.

Figure 11:
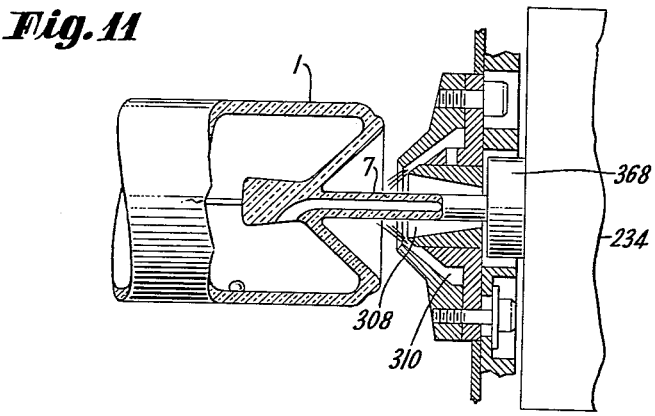
Figures 11, 12 and 13 are enlarged fragmentary sectional views sequentially illustrating the operation of the tipping torch on the tubulation at one end of a lamp.
Figure 12:
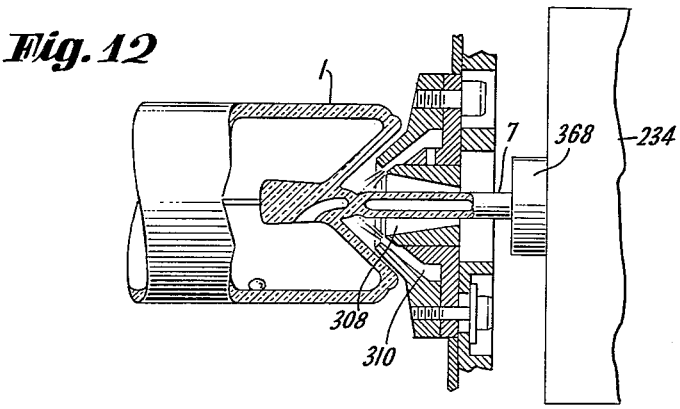

When the cam follower 194 (Fig. 4) traverses fall 180d (Fig. 20) of cam 180, the tipping torch 244 mounted on burner plate 188 moves in toward the lamp from the position shown in Figure 11 to the position shown in Figure 12, since the burner plate 188 is mounted on one end of rod 186 and cam follower 194 is mounted on arm 192 of block 190 which is mounted on the other end of rod 186. During the dwell 180e of cam 180 (Fig. 20), the tipping torch 244 heats the tubulation 7 to a molten state (Fig. 12).

Before the cam follower 194 completes its traversal of dwell 180e, cam follower 210 (Fig. 4) starts to traverse rise 178c (Fig. 21) of cam 178. When the cam follower 210 rides along rise 178c it retracts sleeve 206 (Fig. 4), to which it is connected by arm 208. Retraction of sleeve 206 loads spring 230 which is disposed therein concentric with rod 224 on which mercury dispenser 234 (Fig. 6) of head 22 is mounted, block 274 of head 24 (Fig. 9) being mounted on a corresponding rod 224. Rod 224, loaded by spring 230, retracts the mercury dispenser 234 and thereby effects a stretching and eventual severing of the molten tubulation 7. After the mercury dispenser 234 has retracted sufficiently to effect a severing of the tubulation 7, the cam follower 194 then traverses rise 180f (Fig. 20) to effect retraction of the tipping torch 244. The cam follower 194 and the cam follower 210 then continue to traverse rises 180f (Fig. 20) and 178c (Fig. 21) until dwells 180g and 178d respectively are reached. At this time, the tipping torch 244 and the mercury dispenser 234 have reached their fully retracted positions.

Since the tubulations 7 supported the lamp during exhaust, tipping of the tubulation 7 therefrom frees the lamp and permits it to roll down delivery chute 400 (Fig. 2) mounted on end frames 90, resilient fingers 402 supported from end frames 90 temporarily retarding the completed lamps to prevent breakage as the lamps roll down the chute.

Although the completed lamp has been delivered from the machine, the heads 22, 24 which carried it have to be prepared to receive another lamp at the loading side of the machine. More particularly, the tubulations 7 have to be removed from the heads. Before the tubulations 7 can be removed, however, the gripping force exerted thereon by the resilient collar 362 in head 22 (Fig. 6) and the resilient collar 272 in head 24 (Fig. 9) must be relieved. This occurs when each of the heads 22, 24 moves past the cam follower 392 (Figs. 2 and 10) disposed on spring-loaded lever 394. Since the action on each head is the same, only the action on head 24 will be described, reference being had to Figures 9 and 10.

Cam follower 392 lies in the path of lever 282 of head 24 and thus effects rotation thereof. Rotation of lever 282 effects rotation of threaded cap 280 on which it is clamped. Rotation of cap 280 loosens it and relieves the force which had been applied through ball-bearing race 278 and flange 276 of funnel guide 270 to resilient collar 272. Since lever 282 is connected to lever 288 through gears 284 and 286, the lever 288 is also displaced by the rotation of lever 282 (Fig. 10).

The tubulations 7 are now free to be ejected from the heads 22, 24. This is accomplished by connecting one of the ports 125 (Fig. 17) of stationary plate 124 of valve 26, through one of its tubes 164, to a source of compressed air; and connecting one of the elongated slots 121 or 125 (Fig. 19) of stationary plate 102 of valve 30, through one of its tubes 162, to a source of compressed air. This blast of air into head 22 (Fig. 6) drives the ejector pin 356 forward within the chamber 358 until the head 354 thereof hits the collar 360. This stroke of ejector pin 356 pushes the tubulation 7 out of the head. The return stroke of the ejector pin 356 within its chamber 358 is effected by the tubulation 7 of the next lamp when the head 22 moves into encompassing relationship therewith. The tubulation 7 at the other end of the lamp is similarly ejected (Fig. 9), the blast of compressed air driving ejector pin 296 forward in its chamber 298 until the head thereof abuts collar 294. The return stroke of the ejector pin 296 is effected in the same manner as the ejector pin 356, just described.

What we claim is:

1. Apparatus for exhausting an electric discharge device having at least two tubulations extending therefrom and in communication with the interior thereof, said apparatus comprising: a conveyor for carrying the electric discharge device; a plurality of heads disposed on said conveyor for hermetically engaging the tubulations of the electric discharge device; and valve means disposed on said conveyor and actuated by the movement thereof for establishing communication between one of said heads and a source of flushing gas, and another of said heads and a vacuum pump.

2. Apparatus for exhausting an electric discharge device having at least two tubulations extending therefrom and in communication with the interior thereof, said apparatus comprising: a conveyor for carrying the electric discharge device; a plurality of heads disposed on said conveyor for hermetically engaging the tubulations of the electric discharge device; a first valve means disposed on said conveyor and actuated by the movement thereof for alternately establishing communication between one of said heads and a source of flushing gas and a vacuum pump; and a second valve means disposed on said conveyor and actuated by the movement thereof for establishing communication between another of said heads and a vacuum pump.

3. Apparatus for exhausting an electric discharge device having at least two tubulations extending therefrom and in communication with the interior thereof, said apparatus comprising: a conveyor for carrying the electric discharge device; a plurality of heads disposed on said conveyor for hermetically engaging the tubulations of the electric discharge device; a first valve means disposed on said conveyor and actuated by the movement thereof for alternately establishing communication between one of said heads and a source of flushing gas and a vacuum pump; and a second valve means disposed on said conveyor and actuated by the movement thereof for alternately establishing communication between another of said heads and a source of flushing gas and a vacuum pump.

4. Apparatus for exhausting an electric gaseous discharge device having a tubulation extending from each end thereof, and in communication with the interior thereof, said apparatus comprising: a conveyor; a pair of heads, for gripping the tubulations of the electric gaseous discharge device, disposed on said conveyor; a first valve means disposed on said conveyor, actuated by the movement thereof, and in communication with one head of said pair of heads for establishing communication with a source of flushing gas; and a second valve means disposed on said conveyor, actuated by the movement thereof, and in communication with the other head of said pair of heads for establishing communication with a vacuum pump.

5. Apparatus for exhausting an electric gaseous discharge device having a tubulation extending from each end thereof and in communication with the interior thereof, said apparatus comprising: a conveyor; a pair of heads, for gripping the tubulations of the electric gaseous discharge device, disposed on said conveyor; means for driving said conveyor continuously to move the heads thereon along a predeterminetd path; a first valve means disposed on said conveyor, actuated by the movement thereof, and in communication with one head of said pair of heads for establishing communication with a source of flushing gas; and a second valve means disposed on said conveyor, actuated by the movement thereof, and in communication with the other head of said pair of heads for establishing communication with a vacuum pump.

6. Apparatus for exhausting and sealing an electric discharge device having at least two tubulations extending therefrom and in communication with the interior thereof, said apparatus comprising: a conveyor for carrying the electric discharge device; a plurality of heads disposed on said conveyor for hermetically engaging the tubulations of the electric discharge device; valve means disposed on said conveyor and actuated by the movement thereof for establishing communication between one of said heads and a source of flushing gas, and another of said heads and a vacuum pump; and means disposed in operative relationship with respect to each of the tubulations to effect a sealing thereof.

7. Apparatus for exhausting and sealing an electric discharge device having at least two tubulations extending therefrom and in communication with the interior thereof, said apparatus comprising: a conveyor for carrying the electric discharge device; a plurality of heads disposed on said conveyor for hermetically engaging the tubulations of the electric discharge device; valve means disposed on said conveyor and actuated by the movement thereof for establishing communication between one of said heads and a source of flushing gas, and another of said heads and a vacuum pump; and a tipping torch disposed in operative relationship with respect to each of the tubulations to effect a sealing thereof.

8. Apparatus for exhausting an electric gaseous discharge device having a tubulation extending from each end thereof, and in communication with the interior thereof, and filling the device with an inert gas, said apparatus comprising: a conveyor; a pair of heads, for gripping the tubulations of the electric gaseous discharge device, disposed on said conveyor; a first valve means disposed on said conveyor, actuated by the movement thereof, and in communication with one head of said pair of heads for establishing communication with a source of flushing gas and a source of filling gas; and a second valve means disposed on said conveyor, actuated by the movement thereof, and in communication with the other head of said pair of heads for establishing communication with a vacuum pump.

9. Apparatus for exhausting an electric gaseous discharge device having a tubulation extending from each end thereof and in communication with the interior thereof, and filling the device with an inert gas, said apparatus comprising: a conveyor; a pair of heads, for gripping the tubulations of the electric gaseous discharge device, disposed on said conveyor; means for driving said conveyor continuously to move the heads thereon along a pre-determined path; a first valve means disposed on said conveyor, actuated by the movement thereof, and in communication with one head of said pair of heads for establishing communication with a source of flushing gas and a source of filling gas; and a second valve means disposed on said conveyor, actuated by the movement thereof, and in communication with the other head of said pair of heads for establishing communication with a vacuum pump.

10. Apparatus for exhausting an electric gaseous discharge device having a tubulation extending from each end thereof, and in communication with the interior thereof, said apparatus comprising: a conveyor; a pair of heads disposed on said conveyor; means for moving said heads into encompassing relationship with reespect to the tubulations extending from the ends of the electric gaseous discharge device; a first valve means disposed on said conveyor, actuated by the movement thereof, and in communication with one head of said pair of heads for establishing communication with a source of flushing gas; and a second valve means disposed on said conveyor, actuated by the movement thereof, and in communication with the other head of said pair of heads for establishing communication with a vacuum pump.

11. Apparatus for exhausting an electric gaseous discharge device having a tubulation extending from each end thereof and in communication with the interior thereof, said apparatus comprising: a conveyor; a pair of heads disposed on said conveyor; means for moving said heads into encompassing relationship with respect to the tubulations extending from the ends of the electric gaseous discharge device; means for driving said conveyor continuously to move the heads thereon along a pre-determined path; a first valve means disposed on said conveyor, actuated by the movement thereof, and in communication with one head of said pair of heads for establishing communication with a source of flushing gas; and a second valve means disposed on said conveyor, actuated by the movement thereof, and in communication with the other head of said pair of heads for establishing communication with a vacuum pump.

12. Apparatus for exhausting and filling an electric gaseous discharge device having a tubulation extending from each end thereof, and in communication with the interior thereof, said apparatus comprising: a conveyor; a pair of heads disposed on said conveyor; means for moving said heads into encompassing relationship with respect to the tubulations extending from the ends of the electric gaseous discharge device; a first valve means disposed on said conveyor, actuated by the movement thereof, and in communication with one head of said pair of heads for establishing communication with a source of flushing gas and a source of filling gas; and a second valve means disposed on said conveyor, actuated by the movement thereof, and in communication with the other head of said pair of heads for establishing communication with a vacuum pump.

13. Apparatus for exhausting and filling an electric gaseous discharge device having a tubulation extending from each end thereof and in communication with the interior thereof, said apparatus comprising: a conveyor; a pair of heads disposed on said conveyor; means for moving said heads into encompassing relationship with respect to the tubulations extending from the ends of the electric gaseous discharge device; means for driving said conveyor continuously to move the heads thereon along a pre-determined path; a first valve means disposed on said conveyor, actuated by the movement thereof, and in communication with one head of said pair of heads for establishing communication with a source of flushing gas and a source of filling gas; and a second valve means disposed on said conveyor, actuated by the movement thereof, and in communication with the other head of said pair of heads for establishing communication with a vacuum pump.

14. Apparatus for exhausting and sealing an electric gaseous discharge device having a tubulation extending from each end thereof and in communication with the interior thereof, said apparatus comprising: a conveyor; a pair of heads, for gripping the tubulations of the electric gaseous discharge device, disposed on said conveyor, each head of said pair of heads having a tipping torch for tipping off the tubulation from the electric gaseous discharge device; a first valve means disposed on said conveyor, actuated by the movement thereof, and in communication with one head of said pair of heads for establishing communication with a source of flushing gas; a second valve means disposed on said conveyor, actuated by the movement thereof, and in communication with the other head of said pair of heads for establishing communication with a vacuum pump; and a third valve means disposed on said conveyor, actuated by the movement thereof, and in communication with the tipping torch of each head for establishing communication with a combustible mixture.

15. Apparatus for exhausting and sealing an electric gaseous discharge device having a tubulation extending from each end thereof and in communication with the interior thereof, said apparatus comprising: a conveyor; a pair of heads disposed on said conveyor, each head of said pair of heads having a port therein for receiving a tubulation of the electric gaseous discharge device and a tipping torch concentric with said port for tipping off the tubulation from the electric gaseous discharge device; a first valve means disposed on said conveyor, actuated by the movement thereof, and in communication with one head of said pair of heads for establishing communication with a source of flushing gas; a second valve means disposed on said conveyor, actuated by the movement thereof, and in communication with the other head of said pair of heads for establishing communication with a vacuum pump; and a third valve means disposed on said conveyor, actuated by the movement thereof, and in communication with the tipping torch of each head for establishing communication with a combustible mixture.

16. Apparatus for exhausting and sealing an electric gaseous discharge device having a tubulation extending axially from each end thereof and in communication with the interior thereof, said apparatus comprising: a conveyor; a pair of heads, for gripping the tubulations of the electric gaseous discharge device, disposed on said conveyor, each head of said pair of heads having a tipping torch for tipping off the tubulation from the electric gaseous discharge device; a first valve means disposed on said conveyor, actuated by the movement thereof, and in communication with one head of said pair of heads for establishing communication with a source of flushing gas; a second valve means disposed on said conveyor, actuated by the movement thereof, and in communication with the other head of said pair of heads for establishing communication with a vacuum pump; a third valve means disposed on said conveyor, actuated by the movement thereof, and in communication with the tipping torch of one head of said pair of heads for establishing communication with a combustible mixture; and a fourth valve means disposed on said conveyor, actuated by the movement thereof, and in communication with the tipping torch of the other head of said pair of heads for establishing communication with a combustible mixture.

17. Apparatus for exhausting and sealing an electric gaseous discharge device having a tubulation extending axially from each end thereof and in communication with the interior thereof, said apparatus comprising: a conveyor; a pair of heads disposed on said conveyor, each head of said pair of heads having a port therein for receiving a tubulation of the electric gaseous discharge device and a tipping torch concentric with said port for tipping off the tubulation from the electric gaseous discharge device; a first valve means disposed on said conveyor, actuated by the movement thereof, and in communication with one head of said pair of heads for establishing communication with a source of flushing gas; a second valve means disposed on said conveyor, actuated by the movement thereof, and in communication with the other head of said pair of heads for establishing communication with a vacuum pump; a third valve means disposed on said conveyor, actuated by the movement thereof, and in communication with the tipping torch of one head of said pair of heads for establishing communication with a combustible mixture; and a fourth valve means disposed on said conveyor, actuated by the movement thereof, and in communication with the tipping torch of the other head of said pair of heads for establishing communication with a combustible mixture.

18. Apparatus for exhausting, filling and sealing an electric gaseous discharge device having a tubulation extending from each end thereof and in communication with the interior thereof, said apparatus comprising: a conveyor; a pair of heads, for gripping the tubulations of the electric gaseous discharge device, disposed on said conveyor, each head of said pair of heads having a tipping torch for tipping off the tubulation from the electric gaseous discharge device; a first valve means disposed on said conveyor, actuated by the movement thereof, and in communication with one head of said pair of heads for establishing communication with a source of flushing gas and a source of filling gas; a second valve means disposed on said conveyor, actuated by the movement thereof, and in communication with the other head of said pair of heads for establishing communication with a vacuum pump; and a third valve means disposed on said conveyor, actuated by the movement thereof, and in communication with the tipping torch of each head for establishing communication with a combustible mixture.

19. Apparatus for exhausting, filling and sealing an electric gaseous discharge device having a tubulation extending from each end thereof and in communication with the interior thereof, said apparatus comprising: a conveyor; a pair of heads disposed on said conveyor, each head of said pair of heads having a port therein for receiving a tubulation of the electric gaseous discharge device and a tipping torch concentric with said port for tipping off the tubulation from the electric gaseous discharge device; a first valve means disposed on said conveyor, actuated by the movement thereof, and in communication with one head of said pair of heads for establishing communication with a source of flushing gas and a source of filling gas; a second valve means disposed on said conveyor, actuated by the movement thereof, and in communication with the other head of said pair of heads for establishing communication with a vacuum pump; and a third valve means disposed on said conveyor, actuated by the movement thereof, and in communication with the tipping torch of each head for establishing communication with a combustible mixture.

20. Apparatus for exhausing and filling an electric gaseous discharge device having a tubulation extending axially from each end thereof, and in communication with the interior thereof, said apparatus comprising: a conveyor; a pair of heads, for gripping the tubulations of the electric gaseous discharge device, disposed on said conveyor, one head of said pair of heads including a mercury dispenser; a first valve means disposed on said conveyor, actuated by the movement thereof, and in communication with the mercury dispenser head for establishing communication with a source of flushing gas and a source of filling gas; a second valve means disposed on said conveyor, actuated by the movement thereof, and in communication with the other head of said pair of heads for establishing communication with a vacuum pump; and means for actuating said mercury dispenser to effect delivery therefrom of a quantity of mercury into the path of communication through said mercury dispenser head to the electric gaseous discharge device.

21. Apparatus for exhausting and filling an electric gaseous discharge device having a tubulation extending axially from each end thereof and in communication with the interior thereof, said apparatus comprising: a conveyor; a pair of heads, for gripping the tubulations of the electric gaseous discharge device, disposed on said conveyor, one head of said pair of heads including a mercury dispenser; means for driving said conveyor continuously to move the heads thereon along a pre-determined path; a first valve means disposed on said conveyor, actuated by the movement thereof, and in communication with the mercury dispenser head for establishing communication with a source of flushing gas and a source of filling gas; a second valve means disposed on said conveyor, actuated by the movement thereof, and in communication with the other head of said pair of heads for establishing communication with a vacuum pump; and means for actuating said mercury dispenser to effect delivery therefrom of a quantity of mercury into the path of communication through said mercury dispenser head to the electric gaseous discharge device.

22. Apparatus for exhausting, filling and sealing an electric gaseous discharge device having a tubulation extending from each end thereof and in communication with the interior therof, said appaartus comprising: a pair of heads, for gripping the tubulations of the electric gaseous discharge device, disposed on said conveyor, each head of said pair of heads having a tipping torch for tipping off the tubulation from the electric gaseous discharge device, and one head of said pair of heads including a mercury dispenser; a first valve means disposed on said conveyor, actuated by the movement thereof, and in communication with the mercury dispenser head for establishing communication with a source of flushing gas and a source of filling gas; a second valve means disposed on said conveyor, actuated by the movement thereof, and in communication with the other head of said pair of heads for establishing communication with a vacuum pump; a third valve means disposed on said conveyor, actuated by the movement thereof, and in communication with the tipping torch of each head for establishing communication with a combustible mixture; and means for actuating said mercury dispenser to effect delivery therefrom of a quantity of mercury into the path of communication through said mercury dispenser head to the electric gaseous discharge device.

23. Apparatus for exhausting, filling and sealing an electric gaseous discharge device having a tubulation extending from each end thereof and in communication with the interior thereof, said apparatus comprising: a conveyor; a pair of heads disposed on said conveyor, each head of said pair of heads having a port therein for receiving a tubulation of the electric gaseous discharge device and a tipping torch concentric with said port for tipping off the tubulation from the electric gaseous discharge device, and one head of said pair of heads including a mercury dispenser; a first valve means disposed on said conveyor, actuated by the movement thereof, and in communication with the mercury dispenser head for establishing communication with a source of flushing gas and a source of filling gas; a second valve means disposed on said conveyor, actuated by the movement thereof, and in communication with the other head of said pair of heads for establishing communication with a vacuum pump; a third valve means disposed on said conveyor, actuated by the movement thereof, and in communication with the tipping torch of each head for establishing communication with a combustible mixture; and means for actuating said mercury dispenser to effect delivery therefrom of a quantity of mercury into the path of communication through said mercury dispenser head to the electric gaseous discharge device.

24. Apparatus for exhausting and filling an electric gaseous discharge device having a tubulation extending from each end thereof, and in communication with the interior thereof, said apparatus comprising: a conveyor; a pair of heads disposed on said conveyor, one of said heads including a mercury dispenser; means for moving said heads into encompassing relationship with respect to the tubulations extending from the ends of the electric gaseous discharge device; a first valve means disposed on said conveyor, actuated by the movement thereof, and in communication with the mercury dispenser head for establishing communication with a source of flushing gas and a source of filling gas; a second valve means disposed on said conveyor, actuated by the movement thereof, and in communication with the other head of said pair of heads for establishing communication with a vacuum pump; and means for actuating said mercury dispenser to effect delivery therefrom of a quantity of mercury into the path of communication through said mercury dispenser head to the electric gaseous discharge device.

References Cited in the file of this patent

UNITED STATES PATENTS

| | | |
|---|---|---|
| 2,162,464 | Soderberg | June 13, 1939 |
| 2,258,408 | Cozzoli | Oct. 7, 1941 |
| 2,394,115 | Snyder | Feb. 5, 1946 |
| 2,477,372 | Herzog | July 26, 1949 |